United States Patent Office 3,193,827
Patented July 6, 1965

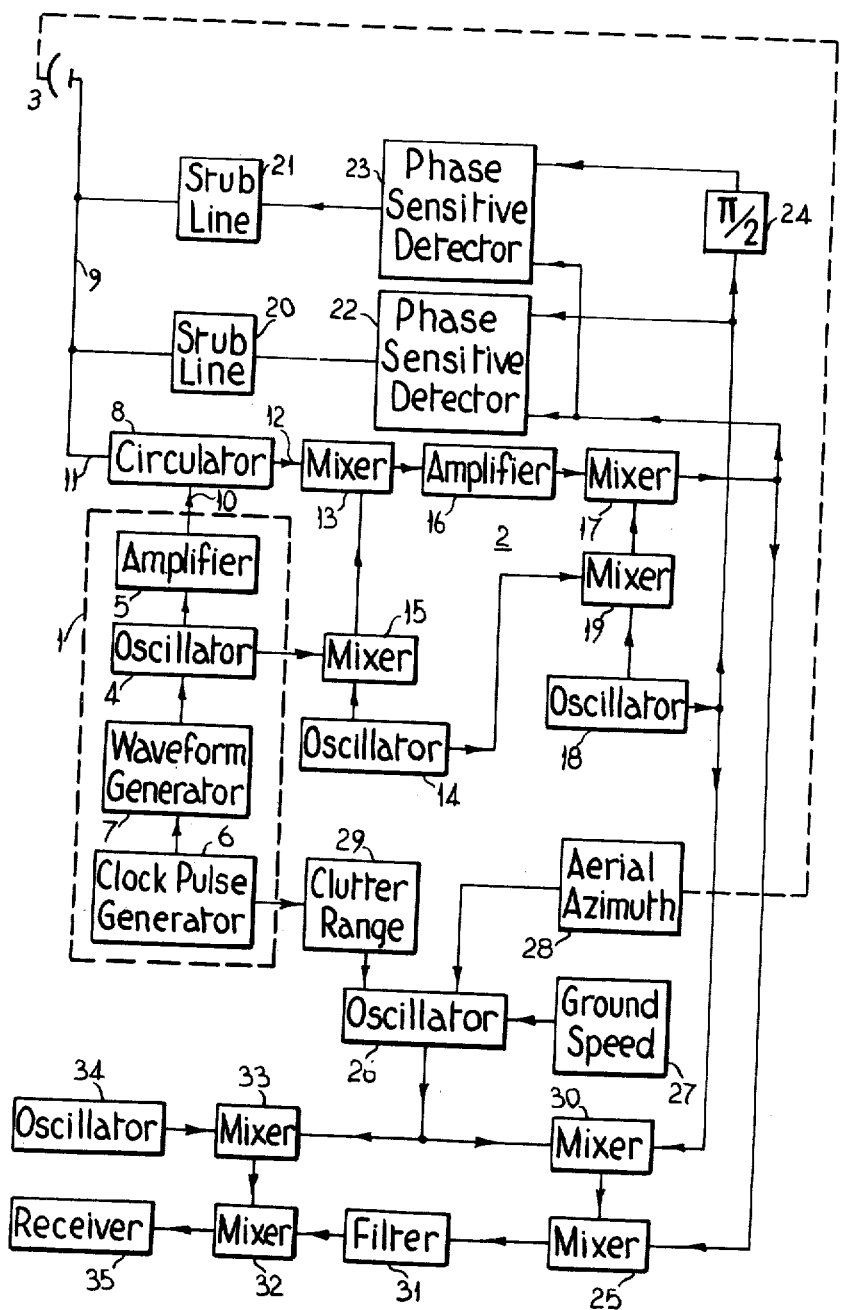

3,193,827
DOPPLER RADAR APPARATUS
Gwilym Phylip Jones, Harrow, Middlesex, and Wilfred Percy Robins, Watford, England, assignors to The General Electric Company Limited, London, England, a British company
Filed Sept. 19, 1962, Ser. No. 224,670
Claims priority, application Great Britain, Sept. 26, 1961, 34,543/61
1 Claim. (Cl. 343—17.5)

This invention relates to Doppler radar apparatus, that is, apparatus for use in a radar system in which radio Doppler effect is used to determine the radial component of the velocity of a targett relative to the radar system. More particularly, the apparatus is for use in a continuous-wave Doppler radar system, that is to say a radar system utilising the Doppler effect in which the transmitted signal is a continuous oscillation.

In addition to providing information as to the velocity of targets, a radar system may also be required to give information as to the range of targets. To enable this to be done, the transmitted signal may be modified or modulated in some way.

In one proposed method of doing this the frequency of the transmitted signal is varied in a predetermined periodic manner. Each such period is constituted by four equal intervals during the first of which the frequency of the transmitted signal increases linearly with respect to time from its normal value to some other value, during the second of which the frequency of the transmitted signal remains constant at said other value, during the third of which the frequency of the transmitted signal decreases linearly with respect to time from said other value to its normal value, and during the fourth of which the frequency of the transmitted signal remains constant at its normal value.

Range information is then obtained by comparing the frequency of a received echo with the frequency of the transmitted signal at the instant the echo is received. It will be appreciated that range information can, in general, only be obtained making use of echoes which are received during the first or third interval in a period. This means that the duration of the intervals must be selected in such a way as to give the possibility of receiving such an echo from the maximum range at which it is desired the system should operate.

A difficulty with this proposed arrangement is that the frequency of signals which give rise to ground clutter will vary in dependence on, amongst other things, variations in the frequency of the transmitted signal, so that it becomes more difficult to provide some means to cancel these signals in the receiver. (References to ground clutter made in this specification should be taken to include sea clutter.)

It is, therefore, an object of the present invention to provide Doppler radar apparatus in which this difficulty encountered with the proposed system outlined above is, at least in part, overcome.

According to the present invention, Doppler radar apparatus comprising a radio transmitter and a radio receiver situated at the same location includes, in the transmitter, means arranged to supply a continuous-wave signal for transmission, and means to vary the frequency of the continuous-wave signal prior to transmission in a predetermined, non-sinusoidal, periodic manner, and, in the receiver, means at least partially to remove from the received signals signals which would give rise to clutter, means to compensate the operation of the last-mentioned means such that its operation is substantially unaffected by said variations in the frequency of the transmitted signal, and means arranged to operate during at least part of each period of the transmitted signal to compare the frequency of an echo with the frequency of the transmitted signal at the instant the echo is received to enable information in respect of the range of a target to be obtained.

Doppler radar apparatus in accordance with the present invention will now be described by way of example with reference to the accompanying block schematic drawing which shows the apparatus.

Referring now to the drawing, the Doppler radar apparatus includes a radio transmitter 1 and a radio receiver 2 which are situated at the same location and which make use of a common aerial 3. In the description which follows it is assumed that the apparatus is mounted in an aircraft. The transmitter 1 includes an oscillator 4 which, in the absence of a further feature of the transmitter 1 about to be mentioned, would supply a continuous sinusoidal signal having a highly stable frequency of $x$ megacycles per second. The signal supplied by the oscillator 4 forms the signal which, after suitable amplification by an amplifier 5, is transmitted.

The transmitter 1 also includes means to vary the frequency of the signal supplied by the oscillator 4 in a predetermined periodic manner. Each such period is constituted by four consecutive intervals, each equal in duration to 15 milliseconds, during the first of which the frequency of the signal supplied by the oscillator 4 increases linearly with respect to time from $x$ megacycles per second to $x$ megacycles per second plus 150 kilocycles per second, during the second of which the frequency of the signal supplied by the oscillator 4 remains constant at $x$ megacycles per second plus 150 kilocycles per second, during the third of which the frequency of the signal supplied by the oscillator 4 decreases linearly with respect to time from $x$ megacycles per second plus 150 kilocycles per second to $x$ megacycles per second, and during the fourth of which the frequency of the signal supplied by the oscillator 4 remains constant at $x$ megacycles per second.

The timing of these intervals is under the control of a clock pulse generator 6, which supplies a train of short-duration pulses having a pulse repetition period of 15 milliseconds to a waveform generator 7 which, in turn, supplies a signal to the oscillator 4, so that the frequency of operation of the oscillator 4 is controlled in the required manner.

The amplified signal is then supplied by way of a circulator 8 and an aerial feeder 9 to the aerial 3.

The circulator 8 has three arms 10, 11 and 12, and operates such that signals supplied to the circulator 8 by way of the arm 10 pass to the arm 11, substantially none of the signals passing to the arm 12, and signals supplied to the circulator 8 by way of the arm 11 pass to the arm 12, substantially none of the signals passing to the arm 10. The signal to be transmitted is supplied to the arm 10 and the aerial feeder 9 is connected to the arm 11 of the circulator 8.

The receiver 2 is connected to the arm 12 of the circulator 8 so that any echo, which comprises a portion of the transmitted signal shifted in frequency to an extent which is dependent upon the radial component of the velocity of the target relative to the aerial 3, is supplied from the aerial 3 by way of the aerial feeder 9 and the arms 11 and 12 of the circulator 8 to the receiver 2.

The receiver 2 includes a mixer 13 to which the echo is supplied together with a first locally-generated signal. The first locally-generated signal is derived from a local oscillator 14 which supplies a signal having a frequency of 40 megacycles per second to a mixer 15, to which is also supplied a signal derived from the oscillator 4 in the transmitter 1. The upper sideband is selected at the output of the mixer 15 and supplied to the mixer 13, this sideband, which forms the first locally-generated signal, having a frequency of $x+40$ megacycles per second.

The lower sideband is selected at the output of the mixer 13, this sideband, which forms a first intermediate frequency signal, having a frequency of 40 megacycles per second (ignoring for the moment the effect of the frequency variations of the transmitted signal). The first intermediate frequency signal is supplied to an amplifier 16, the output of which is supplied to a mixer 17, together with a second locally-generated signal.

The second locally-generated signal is derived from a local oscillator 18 which supplies a signal having a frequency of 2 megacycles per second to a mixer 19, to which is also supplied a signal derived from the local oscillator 14. The lower sideband is selected at the output of the mixer 19 and supplied to the mixer 17, this sideband, which forms the second locally-generated signal, having a frequency of 38 megacycles per second.

The lower sideband is selected at the output of the mixer 17, this sideband, which forms a second intermediate frequency signal, having a frequency of 2 megacycles per second (again ignoring the effect of the frequency variations of the transmitted signal). The second intermediate frequency signal is supplied to the latter stages of the receiver 2 to which reference will be made hereinafter.

In the foregoing description it has been assumed that the circulator 8 operates perfectly, but in practice it is found that there is always some "breakthrough" signal resulting from coupling between the arms between which the circulator 8 is required not to provide coupling. Such a breakthrough signal is due in part to the circulator 8 permitting a certain amount of direct coupling between the arms 10 and 12. It also occurs indirectly, however, where, as is usually the case, the arm 11 is not terminated quite correctly. In this case some of the signal intended for transmission is reflected from the mismatch and passed by normal operation of the circulator 8 to the arm 12 and hence to the receiver 2.

Although the breakthrough signal has only a small fraction of the transmitted power, it is necessary to eliminate it so far as possible, since it is large compared with the power of the minimum amplitude echo which it is required to detect. The method of doing this will now be described.

A portion of the signal intended for transmission which is supplied by way of the circulator 8, the arm 11 and the aerial feeder 9 to the aerial 3 is deliberately reflected back over the arm 11 to the circulator 8 and is, therefore, passed to the receiver 2 by way of the arm 12. The amplitude and phase of this reflected portion of the signal intended for transmission are controlled so that it tends to cancel the breakthrough signal on the arm 12. For this purpose there are provided two variable impedance discontinuities, in the form of tunable waveguide stubs 20 and 21, which are connected to the aerial feeder 9. The waveguide stubs 20 and 21 are similar to one another and may each be similar to the waveguide stubs described in the specification of U.S. patent application No. 12,496, now Patent Number 3,099,794, to the same assignee.

The waveguide stubs 20 and 21 are spaced an odd number of eighths of a wavelength apart along the aerial feeder 9 (the wavelength being that of a signal having a frequency of $x$ megacycles per second, that is, the unvaried frequency of the signal intended for transmission, measured in the aerial feeder 9) and the ends of the waveguide stubs 20 and 21 are provided with short circuits. The wave guide stubs 20 and 21 include variable phase shift devices which are operated by control signals, in a manner now to be described, so as effectively to vary the lengths of waveguide stubs 20 and 21.

The control signals are derived from the second intermediate frequency signal, and for this purpose the second intermediate frequency signal is supplied to phase sensitive detectors 22 and 23. These phase sensitive detectors 22 and 23 are arranged to compare the phase of the second intermediate frequency signal with the phase of the signal supplied by the local oscillator 18, although in the case of the phase sensitive detector 23 the signal supplied by the local oscillator 18 is first passed through a phase shifting network 24 which introduces a phase shift of 90 degrees. The phase sensitive detectors 22 and 23 thus supply output signals that are a measure of the amplitudes of two components of the breakthrough signal supplied over the arm 12 of the circulator 8 that are in phase quadrature.

These two output signals are each passed through a low-pass filter and are then amplified to provide the two control signals, which are supplied to the waveguide stubs 20 and 21 to operate the variable phase shift devices. The arrangement of the waveguide stubs 20 and 21 is then such that two portions of the signal which is intended for transmission and which is supplied over the aerial feeder 9 are reflected back to the circulator 8. These two portions are in phase quadrature with one another, and together substantially cancel the breakthrough signal, which would otherwise be supplied to the receiver 2 by way of the arm 12 of the circulator 8.

The second intermediate frequency signal carrying the target information is supplied to a mixer 25. The signal with which the second intermediate frequency signal is mixed in mixer 25 is obtained indirectly from an oscillator 26. This oscillator supplies a basic output signal of 550 kilocycles per second which is modulated in accordance with the several factors which determine the clutter frequencies.

The clutter signals have a basic bandwidth due to the spread of the beam on the ground and the irregularity of the ground. There is a further variation in the clutter band frequency as the aircraft aerial scans in an arc ahead of the aircraft; thus the scanned portion of ground will have zero relative (radial) velocity at the ends of the arc (i.e. abreast of the aircraft for a semicircular arc) and a maximum relative (radial) velocity directly ahead of the aircraft. The clutter frequency and bandwidth will therefore vary with the azimuthal scanning angle. If the aerial is also scanning in vertical planes there will be a further frequency variation. In all cases the clutter frequency will be a function of the aircraft ground velocity.

In addition to these variations of clutter frequencies there will be a substantial variation due to the modulation of the transmitted signal. This will have the effect of imposing step frequency variations on the clutter band with each discontinuity in the transmitted signal modulation curve.

The basic 550 kilocycles per second of the oscillator 26 is, then, modulated so as to vary with all these factors. The aircraft ground speed is monitored and also the aerial azimuth, the information resulting from this monitoring being supplied to a ground speed corrector 27 and an aerial azimuth corrector 28, respectively. The ground speed corrector 27 and the aerial azimuth corrector 28 then each generate signals which are supplied to the local oscillator 26, these signals causing variations in the frequency of the signal supplied by the local oscillator 26 which are such as to correct for these two factors. As a result of these two corrections the frequency of the signal supplied by the third local oscillator is $550+c$ kilocycles per second, where $c$ is a "clutter correction factor" which varies in the required manner.

The frequency of the signals which would give rise to clutter will also vary as a result of the frequency variations in the transmitted signal. These variations are, however, also predictable if as before it is assumed that the portion of the ground from which the signals which would give rise to the clutter are received is at a constant range from the aircraft. The pulses supplied by the clock pulse generator 6 in the transmitter 1 are therefore supplied to a clutter range corrector 29 to control the timing of a further signal which is generated by the clutter range corrector 29 and is supplied to the local oscillator 26 to vary the frequency of the signal supplied by the local oscillator 26 to be $550+c+c'$ kilocycles per second, where $c'$ is a further "clutter correction factor" to compensate for the variations in the frequency of the transmitted signal. It will be appreciated that during the second and fourth intervals in each period of the transmitted signal the frequency of the transmitted signal is not varying, so during these intervals the value of $c'$ is zero. During the first and third intervals of each period of the transmitted signal $c'$ will have the same value, but during one of these intervals will be of opposite sign as compared with the other of these intervals, as the frequency of the transmitted signal will be varying in the opposite sense.

In addition, it may be desirable to provide still further correction for aircraft attitude, and also for angular motion of the aerial in a vertical plane if the aerial is also scanning in this plane.

The signal from the local oscillator 26 is supplied to a mixer 30, to which is also supplied a signal derived from the local oscillator 18. The lower sideband is selected at the output of the mixer 30, this signal, which has a frequency of $1,450-c-c'$ kilocycles per second, being supplied to the mixer 25 together with the second intermediate frequency signal.

The lower sideband is selected at the output of the mixer 25 and is supplied to a band-stop filter 31 which has a narrow top stop band centered on 550 kilocycles per second. Thus it will be appreciated that the arrangement operates such that the signals which would give rise to clutter are brought to a frequency of 550 kilocycles per second and are therefore rejected by the filter 31.

The output of the filter 31 is supplied to a mixer 32. The signal supplied by the local oscillator 26 is also supplied to a mixer 33 together with a signal having a frequency of 100 kilocycles per second supplied by a local oscillator 34. The upper sideband, having a frequency of $650+c+c'$ kilocycles per second, is supplied to the mixer 32. The lower sideband, having a frequency of 100 kilocycles per second, is selected at the output of the mixer 32, this signal being the echo without the accompaniment of signals which would give rise to clutter.

The signal supplied by the mixer 32 is then supplied to the later stages 35 of the receiver 2 which operate in known manner to determine the frequency shift and, therefore, the required component of the velocity of a target, and also the range of a target.

We claim:

Radar apparatus for use when subject to the effects of clutter signals, comprising a continuous wave transmitter, a receiver at the same location as the transmitter, means to modulate the transmitted signal in a periodic non-sinusoidal manner so that each period of the continuous-wave signal is constituted by four equal intervals during the first of which the frequency of the transmitted signal increases linearly with respect to time from its normal value to some other value, during the second of which the frequency of the transmitted signal remains constant at said other value, during the third of which the frequency of the transmitted signal decreases linearly with respect to time from said other value to its normal value, and during the fourth of which the frequency of the transmitted signal remains constant at its normal value, means to obtain a beat signal dependent upon the difference between the transmitted and received signal frequencies, said clutter signals comprising an irregular frequency band component of said beat signal, continuous wave oscillator means modulated in accordance with the modulation of the transmitted signal, mixing means connected to the oscillator means and to said means to obtain a beat signal, the mixing means being arranged to provide an output signal in which said frequency band of clutter signals is centered about a substantially fixed frequency, filter means connected to the mixing means to remove the band of clutter signals from said output signal, and further mixing means supplied with a signal to remove from the filtered output the frequency variation due to said oscillator means.

References Cited by the Examiner

UNITED STATES PATENTS 3,011,166  11/61  Fell _____ 343—8

CHESTER L. JUSTUS, *Primary Examiner.*